「US010175867B2」

United States Patent
Price et al.

(10) Patent No.: US 10,175,867 B2
(45) Date of Patent: Jan. 8, 2019

(54) USER INPUT-BASED OBJECT SELECTION USING MULTIPLE VISUAL CUES

(71) Applicant: Adobe Systems Incorporated, San Jose, CA (US)

(72) Inventors: Brian L. Price, San Jose, CA (US); Scott D. Cohen, Sunnyvale, CA (US); Jie Feng, New York, NY (US)

(73) Assignee: Adobe Inc., San Jose, CA (US)

( * ) Notice: Subject to any disclaimer, the term of this patent is extended or adjusted under 35 U.S.C. 154(b) by 458 days.

(21) Appl. No.: 15/014,765

(22) Filed: Feb. 3, 2016

(65) Prior Publication Data

US 2017/0220230 A1 Aug. 3, 2017

(51) Int. Cl.

| G06T 7/10 | (2017.01) |
|---|---|
| G06F 3/0484 | (2013.01) |
| G06T 11/60 | (2006.01) |
| G06T 7/215 | (2017.01) |
| G06T 7/143 | (2017.01) |
| G06T 7/11 | (2017.01) |
| G06T 7/194 | (2017.01) |

(52) U.S. Cl.
CPC ............ *G06F 3/04845* (2013.01); *G06T 7/10* (2017.01); *G06T 7/11* (2017.01); *G06T 7/143* (2017.01); *G06T 7/194* (2017.01); *G06T 7/215* (2017.01); *G06T 11/60* (2013.01); *G06T 2200/24* (2013.01)

(58) Field of Classification Search
CPC ... G06T 7/10; G06T 7/11; G06T 7/143; G06T 7/194; G06T 7/215; G06T 11/60; G06T 2200/24; G06F 3/04845
See application file for complete search history.

(56) References Cited

U.S. PATENT DOCUMENTS

| 8,401,242 | B2 * | 3/2013 | Newcombe | A63F 13/06 |
| | | | | 382/107 |
| 9,292,928 | B2 * | 3/2016 | Wan | G06T 7/0081 |
| 9,367,766 | B2 * | 6/2016 | Wang | G06T 7/11 |
| 9,633,446 | B2 * | 4/2017 | Wang | G06T 7/143 |
| 9,858,673 | B2 * | 1/2018 | Ciurea | H04N 13/128 |
| 2006/0285747 | A1 * | 12/2006 | Blake | G06K 9/00234 |
| | | | | 382/180 |
| 2011/0158504 | A1 * | 6/2011 | Turner | G06T 11/001 |
| | | | | 382/154 |
| 2011/0216976 | A1 * | 9/2011 | Rother | G06K 9/34 |
| | | | | 382/173 |

* cited by examiner

*Primary Examiner* — Amy Ng
*Assistant Examiner* — Sajeda Muhebbullah
(74) *Attorney, Agent, or Firm* — Wolfe-SBMC

(57) ABSTRACT

User input-based object selection using multiple visual cues is described. User selection input is received for selecting a portion of an image. Once the user selection input is received, one of a plurality of visual cues that convey different information about content depicted in the image is selected for each pixel. The one visual cue is selected as a basis for identifying the pixel as part of the selected portion of the image or part of an unselected remainder of the image. The visual cues are selected by determining confidences, based in part on the user selection input, that the plurality of visual cues can be used to discriminate whether the pixel is part of the selected portion or part of the remainder. The information conveyed by the selected visual cues is used to identify the pixels as part of the selected portion or part of the remainder.

20 Claims, 8 Drawing Sheets

USER INPUT-BASED OBJECT SELECTION USING MULTIPLE VISUAL CUES

BACKGROUND

Marking specific portions of an image as selected is an indispensable task in digital image editing. Doing so serves as a starting point for many image editing operations, such as background replacement, color and tone manipulation, copying and pasting, and so on. Interactive selection techniques allow a user to provide a selection input or inputs relative to an image to select a portion of the image. For example, a user may make a single tap over a portion of an image displayed that is to be selected. In another example, a user may instead make two taps—one over a portion of an image that is to be selected and another over a different portion of the image that is not to be selected—to select an object from the image. In yet another example, a user may make a series of strokes on a touch-enabled display with a finger over portions of an image that are to be selected. A digital computer system can use these different types of user selection inputs, along with information about the image, to determine a selected portion of the image.

Many conventional techniques for selecting image objects from images based on user input typically determine which portions are selected using solely color information of the image. Developments in imaging equipment now enable information to be collected about a scene when capturing an image beyond mere color information. For example, imaging equipment developments have enabled depth information, which indicates distances of objects from an image capturing device, to be collected about a scene. However, conventional techniques use this additional information in limited ways to select objects from images according to user inputs. As a result, conventional techniques fail to fully leverage this additional information to improve user-aided object selection.

SUMMARY

User input-based object selection using multiple visual cues is described. In one or more implementations, a digital medium environment is described in which a method is implemented to define a portion of an image as selected based on user selection input. A user selection input is received for selecting a portion of the image. By way of example, the user selection input may be received as a tap on a display over a portion of the image that is to be selected. Once the user selection input is received, one of a plurality of visual cues that convey different information about content depicted in the image is selected for each pixel. The one visual cue is selected to serve as a basis for identifying the pixel as part of the selected portion of the image or as part of a remainder of the image that is not selected. The visual cues are selected by determining a respective confidence, based in part on the user selection input, that the information conveyed by each of the plurality of visual cues can be used to discriminate whether the pixel is part of the selected portion of the image or part of the remainder.

The information conveyed by the selected visual cues is used to identify the pixels of the image as being part of the selected portion or part of the remainder. Selected portion data can then be generated that defines the selected portion according to the pixels identified as part of the selected portion. In addition to selected portion data, a map can be generated for a selection that indicates which visual cues served as a basis for identifying the pixels of the image as selected or not selected.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
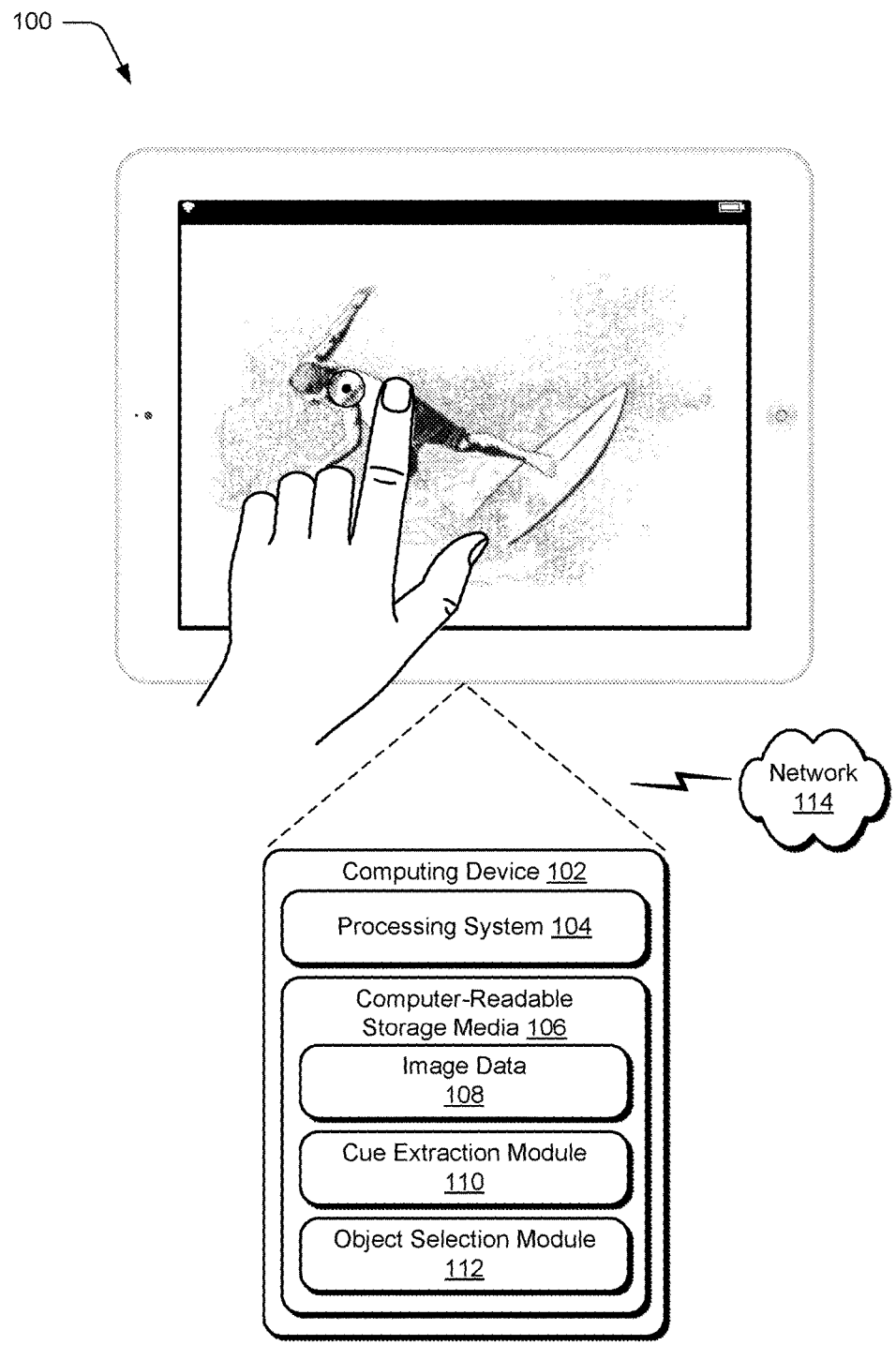
FIG. 1 is an illustration of a digital medium environment in an example implementation that is operable to employ user input-based object selection using multiple visual cues as described herein.

Many conventional techniques for selecting image objects from images based on user input typically determine which portions are selected using solely color information of the image. Even the techniques that leverage additional information collected about a captured scene, such as depth information, are limited in the ways they use this information for selection of objects from an image. By way of example, these conventional techniques use the depth information as an additional color channel or simply combine the depth with color in a linear manner. However, the advantages of leveraging the additional information in these ways are limited, both in terms of efficiency and accuracy.

With regard to efficiency, for instance, combining color with depth (or other color cues) can be computationally expensive—such techniques involve computing values of color and the additional information, and also performing computations to combine the computed values according to a function or equation, the result of which is a combined-information value for a pixel that is used to determine whether the pixel is part of a selected portion. With regard to accuracy, the value that results from combining the color information with the additional other information can be less discriminative than the color information alone or than the depth information alone. Consequently, the combined value's less discriminative nature can cause pixels to be wrongly identified as part of the selected portion or part of an unselected remainder of the image.

User input-based object selection using multiple visual cues is described. The techniques described herein leverage the information conveyed by multiple different visual cues to improve both the efficiency and accuracy of user-aided selection from an image over conventional techniques. As used herein, a "visual cue" refers to information that an imaging device can capture about a visual attribute of the scene being sensed, e.g., color information such as red green blue ("RGB") values, depth information, and so on. A "visual cue" can also refer to information about a visual attribute that can be derived from the captured information, such as surface normal information which can be derived from depth information captured about a scene. Other examples of visual cues include motion information, texture information, in the case of rendered images three dimensional (3D) mesh structure information, 3D point cloud information, and so on.

Regardless of the visual cues available, the techniques described herein differ from conventional techniques, which combine the information conveyed by multiple different cues to select portions of an image. Instead, the techniques described herein automatically choose a single visual cue for each pixel of the image to make a selection. Said another way, the techniques described herein select a portion of an image according to a user selection input without combining the information conveyed by multiple different visual cues, e.g., without combining the information according to a linear function as do some conventional techniques. Rather, a single visual cue is chosen for each of the pixels based on the notion that the information conveyed by the single visual cue is sufficient to determine whether the pixel is part of a selected portion of the image or part of a remainder that is not selected. In so doing, the techniques described herein utilize both segmentation labels, which are used to label a pixel as selected or not selected, and visual cue labels, which are used to label a pixel with the visual cue used that provides the information for identifying the pixel as selected or not. The selected portion of the image is selected by performing an optimization over the segmentation labels and the visual cue labels.

The optimization involves determining respective confidences that the visual cues convey information that is discriminative as to whether a pixel of the image is part of the selected portion or not. In other words, for a given pixel, a visual cue is generally chosen for which the confidence is greatest, e.g., a confidence that the information conveyed by the chosen visual cue is discriminative as to the pixel's designation (as part of the selected portion or as part of the remainder of the image). The information conveyed by the chosen visual cues is used to identify the pixels as part of the selected portion or part of the remainder of the image. By way of example, if the visual cue chosen for a given pixel is a color cue that conveys information about color of content depicted in the image, then the information about the color of the image at that pixel is used to determine whether it is selected or not. Alternately, if the visual cue chosen for the given pixel is a depth cue that conveys depth information that indicates a distance of content depicted in the image from an image capturing device, then the depth information is used at that pixel to determine whether the pixel is selected or not.

The information conveyed by the chosen visual cue(s) is used, along with an indication of a selection made by a user, to identify whether each pixel of the image is to be labeled as part of the selected portion or not. Data can then be generated for the selection to indicate the selected portion of the image. By way of example, the selected portion data may define a binary mask that is applicable to the selected portion of the image to enable image editing operations to be performed relative the selected portion, such as background replacement, color and tone manipulation, copying and pasting, and so forth. In some scenarios, a map can be derived from. The map indicates which of the visual cues were used for each pixel to contribute to the selection. For instance, the map can show the selected pixels for which depth information was used, the unselected pixels for which depth information was used, the selected pixels for which color information was used, the unselected pixels for which color was used, the selected pixels for which surface normal information was used, the unselected pixels for which surface normal information was used, and so on.

The techniques described herein lessen an amount of user interaction needed to make an accurate selection of an object from an image compared to conventional techniques. With regard to selecting an image object from an image, user interaction can involve receiving a variety of clicks, strokes, or scribbles to identify portions of the image that are to be selected. Thus, the techniques described herein accurately select an object from an image based on fewer clicks than conventional techniques generally need to make an accurate selection. Additionally, these techniques improve computational efficiency of accurately selecting objects from images.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein for user input-based object selection using multiple visual cues. The illustrated environment 100 includes a computing device 102 having a processing system 104 that includes one or more processing devices (e.g., processors) and one or more computer-readable storage media 106. The illustrated environment 100 also includes image data 108, a cue extraction module 110, and an object selection module 112 embodied on the computer-readable storage media 106 and operable via the processing system 104 to implement corresponding functionality described herein. In at least some implementations, the computing device 102 includes functionality to access various kinds of web-based resources (content and services), interact with online providers, and so forth as described in further detail below.

The computing device 102 is configurable as any suitable type of computing device. For example, the computing device 102 may be configured as a server, a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 8.

The computing device 102 is further operable to communicate over a network 114, such as the Internet, to provide a "cloud-based" computing environment, in which the computing device 102 interacts with one or more service providers. Generally speaking, service providers are configured to make various resources available over the network 114 to clients. In some scenarios, users sign up for accounts that are employed to access corresponding resources from a provider. The provider authenticates credentials of a user (e.g., username and password) before granting access to an account and corresponding resources. Other resources are made freely available, (e.g., without authentication or account-based access). The resources can include any suitable combination of services and/or content typically made available over a network by one or more providers. Some examples of services include, but are not limited to, content creation services that offer image editing and drawing applications (e.g., Creative Cloud®, and the like), image storage and/or sharing services, social network services (e.g., Facebook®, Twitter®, Instagram®, Hyperlapse®, and the like), and so forth.

These sources serve as significant amounts of image data. Image data 108 represents such image data, which may be formatted in any of a variety of image formats, including but not limited to JPEG, TIFF, RAW, GIF, BMP, PNG, and so on. The image data made available through the services may be posted by users that have accounts with those services. For example, a user having an account with an image storage and/or sharing service uploads images, such as those edited with an image editing application at computing device 102 of the user, or those sent to the user via electronic means. A user of the image storage and/or sharing service may then share their uploaded images with others, such as by providing a link to albums of images or to a profile of the user.

The cue extraction module 110 and the object selection module 112 represent functionality to implement techniques for user input-based object selection using multiple visual cues as described herein. As part of implementing these techniques, the cue extraction module 110 extracts information about visual cues for each pixel of an image. By way of example, the cue extraction module 110 extracts information for a pixel that indicates a distance between an object depicted at the pixel and an imaging device used to capture the image. As used herein, this distance is referred to as "depth". As another example, the cue extraction module 110 extracts information for a pixel that indicates a red green blue (RGB) color value for the pixel.

The cue extraction module 110 represents functionality to extract different information for multiple different visual cues at each pixel of an image. A result of the extracting is that each pixel of an image is associated with multiple values corresponding to the multiple visual cues. For instance, a given pixel can be associated with information indicative of a color of the pixel, a depth of the pixel, surface normal of the pixel, and so on. In one or more implementations, the cue extraction module 110 generates visual cue maps to indicate for each pixel of an image the information for the different visual cues. By way of example, a map generated for one of the visual cues indicates a corresponding value for each pixel of the image. In other words, a color cue map is capable of indicating color information (e.g., RGB value) for each pixel of an image, a depth map is capable of indicating a depth of depicted content for each pixel of the image, a surface normal map is capable of indicating surface normal information (e.g., a vector describing the surface normal) of depicted content for each pixel of the image, and so on.

The object selection module 112 represents functionality to select a portion of an image (e.g., an object from the image) based on one or more user selection inputs and the information conveyed by the multiple visual cues about the depicted content of the image. In identifying the selected portion, the object selection module 112 chooses for each pixel of the image a single visual cue. The information conveyed by the chosen visual cue is used to determine whether the pixel is to be included as part of the selected portion of the image or part of a remainder of the image that is not selected. By choosing one visual cue for each pixel and analyzing the information conveyed by the chosen visual cue, the object selection module 112 designates each pixel of the image as part of the selected portion or as part of the remainder.

To choose between the different visual cues, the object selection module 112 determines a value indicative of a level of confidence in the information conveyed by the multiple visual cues. In other words, the visual cue chosen for a pixel is generally the visual cue in which the object selection module 112 has the greatest confidence, e.g., the greatest confidence that the information conveyed by the visual cue is discriminative as to whether the pixel is part of the selected portion or not. The object selection module 112 is configured to optimize its choice of visual cues across the image as a function of both visual cue labels (e.g., which can be set to indicate each of the multiple different visual cues) and segmentation labels (e.g., which can be set to indicate that a pixel is part of the selected portion or not).

Using the chosen visual cues, the object selection module 112 identifies each pixel of the image as part of the selected portion of the image or as part of the remainder of the image that is not selected. By way of example, if for a given pixel the depth cue is chosen and the information conveyed by the depth cue indicates that the given pixel is part of the selected portion, then the given pixel is identified as part of the selected portion.

Consider a scenario in which a user provides a selection input, such as a single tap, relative to an object depicted in an image. Assume that the object is multiple different colors, e.g., a striped shirt. In conventional color-based selection techniques, borders between colors may cause the techniques to incorrectly indicate a border of the object the user intends to select, e.g., a stripe of a different color may cause conventional techniques to select a stripe as the selected object even though the user intends to select the whole striped shirt. By using the information provided by the depth cue, however, the object selection module 112 can determine that the pixels corresponding to the striped shirt are at substantially a same depth and therefore are to be identified as part of the selected portion of the image.

In any case, once the pixels are identified as part of the selected portion or as part of the unselected remainder, the object selection module 112 can generate selected portion data to define the selected portion. The selected portion data may define a binary selection mask that is applicable to the image by an image editing application to enable image editing operations to be performed relative to the selected portion or, alternately, to solely the remainder of the image. The selected portion data may define the selected portion in a variety of other ways without departing from the spirit or scope of the techniques described herein, such as to define another image file that is separate from an image file that corresponds to the image from which the selected portion is selected.

In one or more implementations, the cue extraction module 110 and the object selection module 112 are implementable as software modules, hardware devices, or using a combination of software, hardware, firmware, fixed logic circuitry, etc. Further, the cue extraction module 110 and the object selection module 112 can be implementable as stand-alone components of the computing device 102 as illustrated. In some embodiments, the cue extraction module 110 and the object selection module 112 can be configured as components of a web service, an application, an operating system of the computing device 102, a plug-in module, or other device application as further described in relation to FIG. 8.

Having considered an example environment, consider now a discussion of some example details of the techniques for user input-based object selection using multiple visual cues in accordance with one or more implementations.

User Input-Based Object Selection Using Multiple Visual Cues

Figure 2:
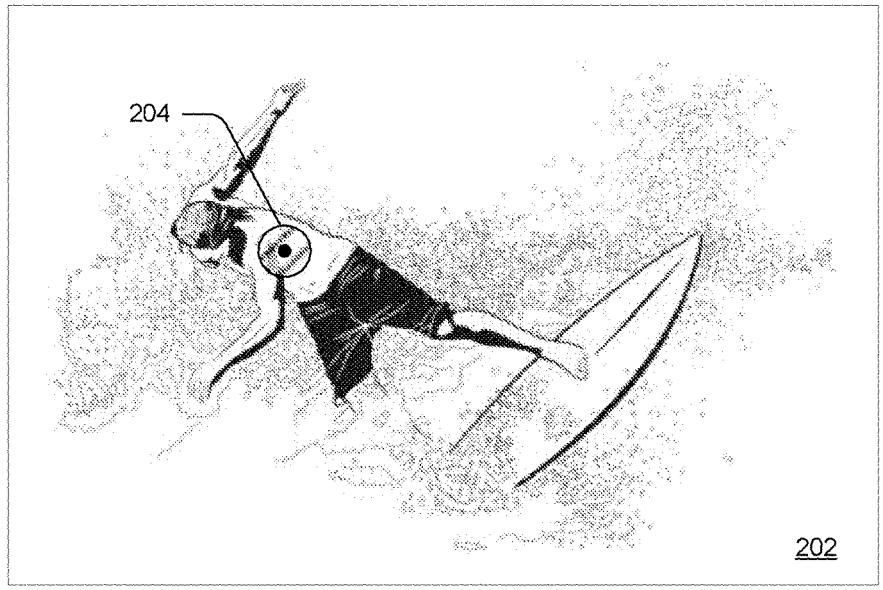
FIG. 2 illustrates an example of an image relative to which a user selection input is made to select a portion of the image, and an example of the portion of the image that is eventually selected based on the selection input and using multiple visual cues.
Figure 2:
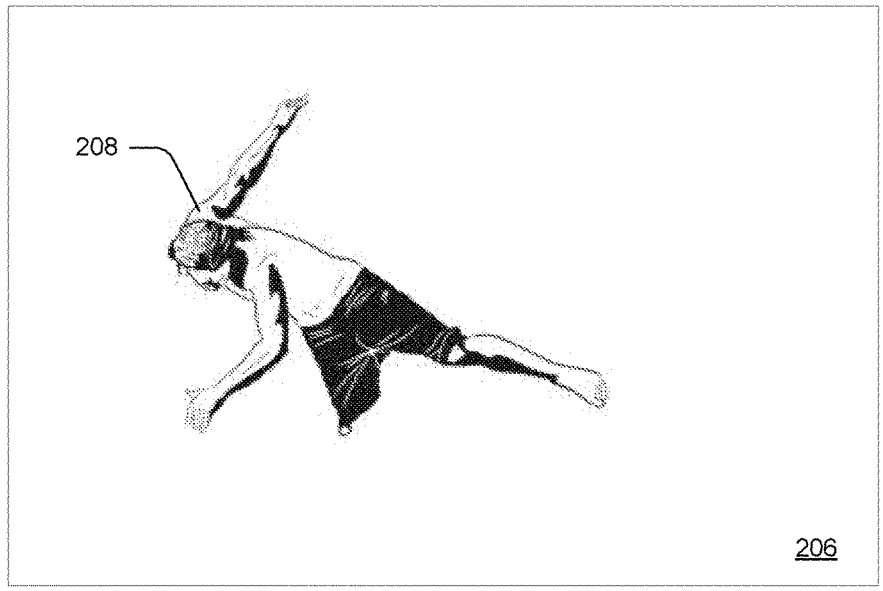

This section describes some example details of techniques for user input-based object selection using multiple visual cues in accordance with one or more implementations. FIG. 2 depicts an example 200 of an image relative to which a user selection input is made to select a portion of the image, and an example of the portion of the image selected based on the selection input and using multiple visual cues.

The illustrated example 200 includes image 202 of a scene that includes a surfer. The image 202 can be included as part of the image data 108 maintained at the computing device 102. The illustrated example 200 also includes a representation of selection input 204, which represents input received to select a portion of the image 202. In the scenario illustrated by FIG. 1, the selection input 204 may correspond to a single tap made by a user on a touch enabled display device of the computing device 102 that displays the image 202. The selection input 204 may correspond to other types of inputs made relative to the image 202, such as one or more mouse clicks, scribbled selection inputs (e.g., made with a finger, a mouse, a stylus, and so on), keyboard inputs, stylus inputs, touch inputs, and so forth.

The illustrated example 200 also includes a second image 206, in which selected portion 208 of the image is depicted without other portions of the scene depicted in the image 202. Like the image 202, the second image 206 can be included as part of the image data 108 maintained by the computing device 102. The second image 206 may correspond to a different version of the image 202 in which portions other than the selected portion 208 are deleted. The second image 206 may also represent application of a binary mask to the image 202 to enable the selected portion 208 to be displayed without a remainder of the image. Alternately or in addition, the second image 206 may correspond merely to the selected portion 208, such that the dimensions of the second image 206 correspond to the bounds of the selected portion 208. In any case, the portion of the image 202 that is eventually selected (e.g., the selected portion 208) according to the selection input 204 is illustrated in the second image 206. Further, the selected portion 208 is selected according to user input-based object selection using multiple visual cues.

Figure 3:
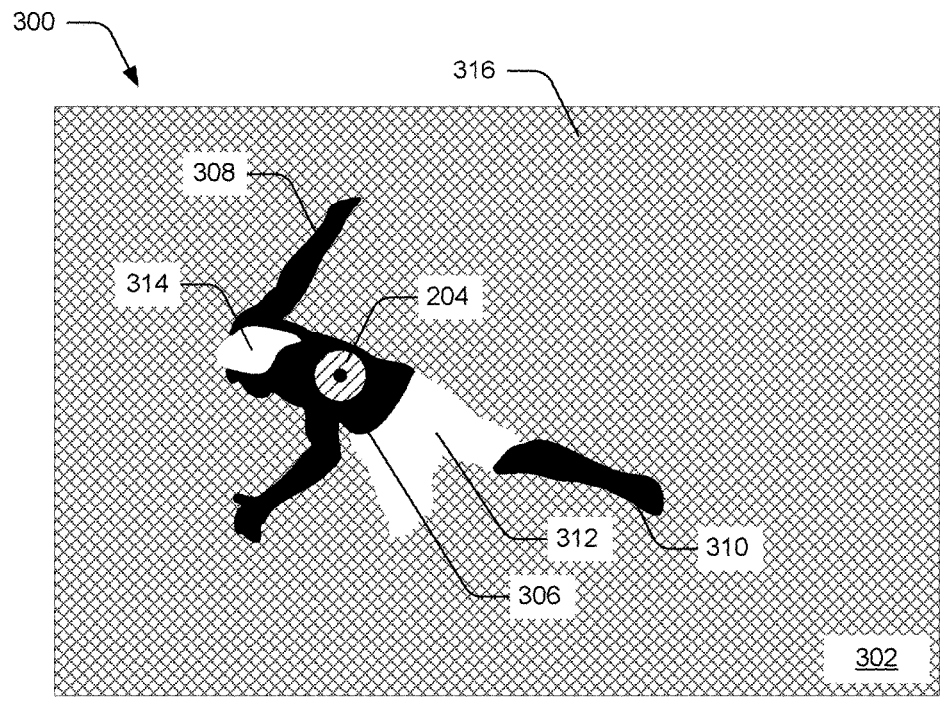
FIG. 3 illustrates examples of different information conveyed by two visual cues about content depicted in an image and that can be used to select a portion of the image.
Figure 3:
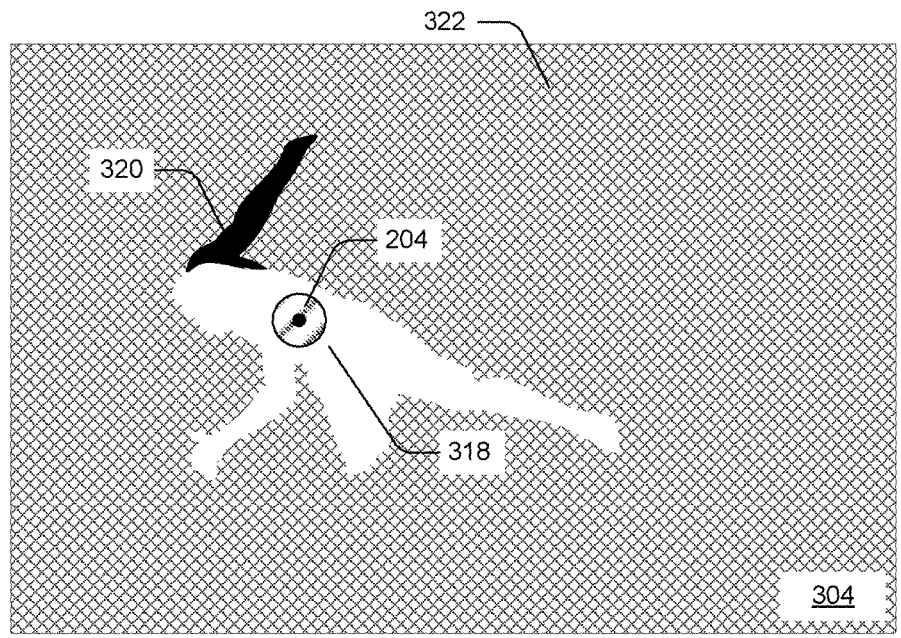

FIG. 3 depicts an example 300 of different information for two visual cues conveyed about content depicted in an image and that can be used to select a portion of an image. In particular, visual cue map 302 represents an example of a visual cue map generated to convey information about the image 202 that corresponds to a first visual cue. Visual cue map 304 represents an example of a visual cue map generated to convey different information about the image 202 that corresponds to a second visual cue. By way of example, visual cue map 302 may represent an example of a color cue map that conveys color information about the image 202, and the visual cue map 304 may represent an example of a depth cue map that conveys depth information about the image 202.

With reference to visual cue map 302, portions 306, 308, 310 (which are depicted as the solid black-colored portions) correspond to content depicted in the image 202 for which the information conveyed by the first visual cue is similar. Portions 312, 314 (which are depicted as the solid white-colored portions) correspond to content depicted in the image 202 for which the information conveyed by the first cue is similar, but is different from the information about the portions 306, 308, 310. The crosshatched portion of the visual cue map 302 (e.g., portion 316) corresponds to content depicted in the image 202 for which the information conveyed by the first cue is different from the information conveyed about the portions 306, 308, 310 and from the information conveyed about the portions 312, 314.

Given the example in which the visual cue map 302 represents a color cue map, which conveys color information about the image 202, consider the following. With reference to the portions introduced above, the color information conveyed by the visual cue map 302 represents that the pixels of the image 202 which correspond to the portions 306, 308, 310 are similarly colored (e.g., the difference in color is less than a threshold difference). Considering the image 202, the portions 306, 308, 310 may correspond to the skin of the depicted surfer and thus be similarly colored. Further, the color information conveyed by the visual cue map 302 represents that the pixels of the image 202 which correspond to the portions 312, 314 are also similarly colored, but are differently colored than the portions 306, 308, 310. Given the image 202, the portions 312, 314 may correspond to the hair and swimsuit of the depicted surfer, respectively, and in this scenario may be similarly colored (e.g., both the hair and the swimsuit may be black, brown, red, etc.). Finally, the color information conveyed by the visual cue map 302 represents that the pixels of the image 202 which correspond to the portion 316 are similarly colored, but differently colored than the portions 306, 308, 310 and differently colored than the portions 312, 314. Considering again the image 202, the portion 316 may correspond to the water and the surfboard depicted in the image 202, and in this scenario be colored similarly (e.g., the water and the surfboard may be blues, greens, greys, etc.).

Turning back to the discussion of the visual cue map 304, portion 318 (which is depicted as the solid white-colored portion) corresponds to content depicted in the image 202 for which the information conveyed by the second visual cue is similar. Portion 320 (which is depicted as the solid black-colored portion) corresponds to content depicted in the image 202 for which the information conveyed by the second cue is similar, but is different from the information about the portion 318. The crosshatched portion of the visual cue map 304 (e.g., portion 322) corresponds to content depicted in the image 202 for which the information conveyed by the second cue is similar, but is different from the information conveyed about the portion 318 and from the information conveyed about the portion 320.

Given the example in which the visual cue map 304 represents a depth cue map which conveys depth information about the image 202, consider the following. With reference to the portions introduced just above, the depth information conveyed by the visual cue map 304 represents that the pixels of the image 202 which correspond to the portion 318 have a similar depth in the scene, e.g., the difference in depth is less than a threshold difference. Considering the image 202, the portion 318 may correspond to some of the depicted surfer's body that is approximately at a first depth in the scene. Further, the depth information conveyed by the visual cue map 304 represents that the pixels of the image 202 which correspond to the portion 320 have a different depth than the portion 318. Given the image 202, the portion 320 may correspond to an arm of the depicted surfer that extends further into the scene, which causes the arm to have a different depth than the portion of the surfer's body that corresponds to the portion 318. Finally, the depth information conveyed by the visual cue map 304 represents that the pixels of the image 202 which correspond to the portion 322 have a different depth than the portion 318 and a different depth than the portion 320. Considering again the image 202, the portion 322 may correspond to the water and the surfboard depicted in the image 202, and in this scenario correspond to even greater depths in the scene.

It should be appreciated that the visual cue maps 302, 304 are merely representations of the visual cue maps that the cue extraction module 110 is capable of generating. The cue extraction module 110 can also receive such maps after the maps are generated and simply process them. In any case, the visual cue maps 302, 304 illustrated may not resemble actual visual cue maps. Thus, an actual color cue map will look different than the visual cue map 302 and an actual depth cue map will look different than the visual cue map 304.

For the purpose of discussion, the visual cue maps 302, 304 are also depicted with indications of the selection input 204. The object selection module 112 is configured to use the selection input 204 along with the information conveyed by the visual cue maps 302, 304 to select the selected portion 208. Assume that a user provides the selection input 204 to select the selected portion 208. The visual cue map 302 indicates that a location of the selection input 204 is within the portion 306, for which the information conveyed by the visual cue map 302 is similar to that of the portions 308, 310 (e.g., in the example in which the visual cue map 302 conveys color information, these portions have similar color). However, the information conveyed about the portions 306, 308, 310 is different from the information conveyed about the portions 312, 314 (e.g., which are different in color from the portions 306, 308, 310), even though those portions also correspond to the surfer, e.g., that the user intends to select. Thus, using solely the information provided by the visual cue map 302, conventional techniques may not include the portions 312, 314 as part of the selected portion 208 since the first visual cue corresponding to the visual cue map 302 indicates different information for those portions.

With regard to the selection input 204 and the visual cue map 304, the visual cue map indicates that the location of the selection input is within the portion 318 (e.g., in the example in which the visual cue map 304 conveys depth information, this portion is at approximately the first depth). However, the information conveyed about the portion 320 is different from the information conveyed about the portion 318 (e.g., which has a different depth from the portion 320), even though that portion also corresponds to the surfer the user intends to select. Thus, using solely the information provided by the visual cue map 304, conventional techniques may not include the portion 320 as part of the selected portion 208 since the second visual cue corresponding to the visual cue map 304 indicates different information for the portion 320. Using the techniques described herein, however, the second visual cue information corresponding to the portion 318 (e.g., taken from the visual cue map 304) may be used to identify corresponding pixels of the image 202 as part of the selected portion 208. Further, the first visual cue information corresponding to the portion 308 (e.g., taken from the visual cue map 302) may be used to identify corresponding pixels of the image 202 as part of the selected portion 208.

Figure 4:
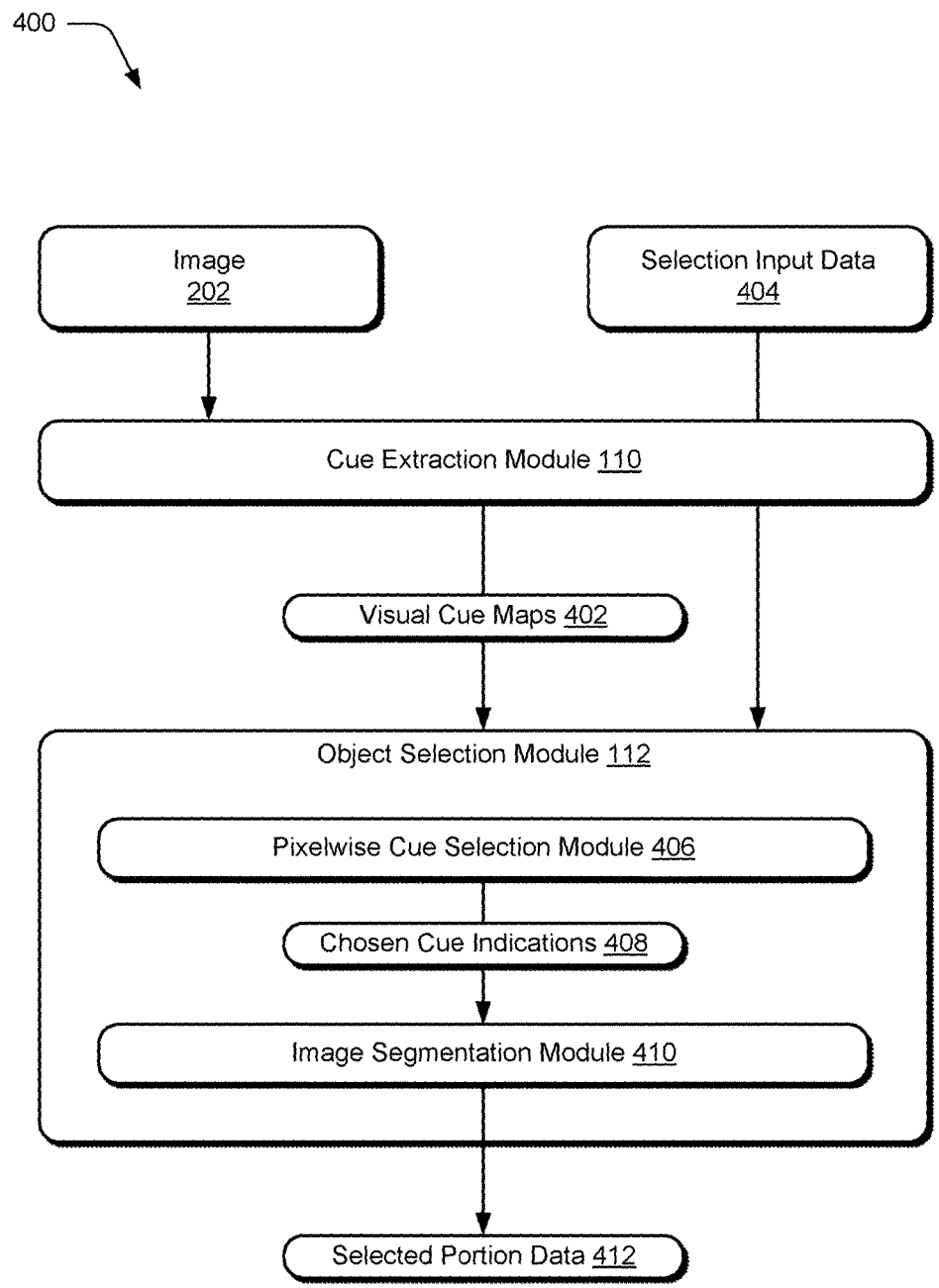
FIG. 4 depicts a system in an example implementation that is configured to determine a selected portion of an image from a user selection input and using multiple visual cues.

FIG. 4 depicts a system 400 for determining a selected portion of an image from a user selection input, such as the selection input described with reference to FIG. 2, and using multiple visual cues, such as using the information provided by the visual cues described with reference to FIG. 3. The example system 400 includes the cue extraction module 110 of FIG. 1, which takes as input the image 202. From the image 202, the cue extraction module 110 generates visual cue maps 402. Each of the visual cue maps 402 can convey information corresponding to a different visual cue about the image 202. As discussed above, visual cues can be utilized to convey different information for each pixel of an image, such as information about the image's color, a distance between objects depicted in the image and a device used to capture the image, a surface normal of objects depicted in the image, motion information, texture information, 3D mesh structure information, 3D point cloud information, and so on. The visual cue maps 302, 304 are examples of the visual cue maps that the cue extraction module 110 is capable of generating to convey different information about the image 202.

In addition to the cue extraction module 110, the example system 400 includes the object selection module 112 of FIG. 1, which is depicted taking as input the visual cue maps 402 and selection input data 404. The selection input data 404 is data that is indicative of the selection input 204, received for selecting a portion of the image 202. By way of example, the selection input data 404 may indicate a position of an object used to make a selection, e.g., a finger, a stylus, a mouse, and so on, at different times, such as at an initial time when the selection input is first received, at a termination time when receipt of the selection input stops, and at times in between the initial and termination times. Further, the section input data 404 indicates the pixels of the image 202 over which an object used to make the selection input (e.g., a finger, a stylus, a mouse etc.) passed. In other words, the selection input data 404 indicates the pixels of the image 202 that correspond to the selection input 204.

The object selection module 112 uses the visual cue maps 402 and the selection input data 404 to identify pixels of the image 202 as being part of the selected portion 208 or part of an unselected remainder of the image. In FIG. 4, the object selection module 112 is illustrated with pixelwise cue selection module 406, chosen cue indications 408, and image segmentation module 410. The pixelwise cue selection module 406 represents functionality of the object selection module 112 to choose which of the multiple visual cues, for which information is available for the image 202 (e.g., available in the form of the visual cue maps 402), is to provide the information used to identify each pixel of the image 202 as selected or not selected. The chosen cue indications 408 represent the visual cue that is chosen for each pixel of the image, such that for the pixel in the upper left hand corner of the image 202 the chosen cue indications 408 provide an indication of the visual cue chosen, and for the pixel adjacent on the right to the upper left pixel the chosen cue indications 408 provide an indication of the visual cue chosen, and so on, for each pixel of the image.

To identify each pixel of the image 202 as being part of the selected portion or part of the remainder of the image, the pixelwise cue selection module 406 uses a visual cue selection approach which, given a user selection input, uses one visual cue to explain the identification result for each pixel. In the cue selection approach, the pixelwise cue selection module 406 forms a label pair $X_i = \langle S_i, C_i \rangle$ for each pixel i of an image from which a selection is being made, e.g., a label pair is formed for each pixel of image 202.

The term $S_i$ represents a label that can be set to identify whether pixel i is part of the selected portion or part of the unselected remainder. The image segmentation module 410 is configured to set the label to zero or one to indicate whether a pixel is part of the selected portion or part of the unselected remainder. In one example, setting the label $S_i$ to zero indicates that pixel i is not part of the selected portion (e.g., instead pixel i is part of the unselected remainder) while setting the label $S_i$ to one indicates that pixel i is part of the selected portion. In a different example, the image segmentation module 410 sets the label $S_i$ to one to indicate that pixel i is not part of the selected portion (e.g., instead pixel i is part of the unselected remainder) or sets the label $S_i$ to zero to indicate that pixel i is part of the selected portion.

The term $C_i$ represents a label for a visual cue chosen for the pixel i. The pixelwise cue selection module 406 sets the label for a visual cue to an integer value from zero to N−1 when there are N different visual cues. To do so, the pixelwise cue selection module 406 assigns each of the N-different visual cues an integer value from zero to N−1. Consider an example in which color information, depth information, and surface normal information are available for identifying pixels as part of the selected portion of the image or as part of the unselected remainder portion. In this example, N equals three and N−1 equals two, so the pixelwise cue selection module 406 can assign the different visual cues (the color cue, the depth cue, and the normal cue) integer values from zero to two. It should be noted that the integer assigned to represent each visual cue is of no import other than to represent the visual cue. Thus, in one scenario the color cue may be assigned zero, the depth cue assigned one, and the surface normal assigned two, while in another scenario the depth cue may be assigned zero, the surface normal cue assigned one, and the color cue assigned two. Given the latter scenario, if the pixelwise cue selection module 406 chooses the color cue for the pixel i, then the pixelwise cue selection module 406 sets term $C_i$ in the label pair equal to two.

By linearizing the label pair $X_i = \langle S_i, C_i \rangle$ into a label within a [0,2×N) range, the equation to be solved can correspond to a multi-label Markov Random Field (MRF) energy function as follows:

$$E(X) = \sum_{i \in \Omega} D(X_i) + \lambda \sum_{(i,j) \in N} f(X_i, X_j)$$

Here, the term E(X) represents an energy of the function for choosing labels for each pixel of the image. The object selection module 112 performs an optimization of this equation by employing the pixelwise cue selection module 406 and the image segmentation module 410 to choose labels for the label pairs that minimize the energy of the function. The term $D(X_i)$ is a unary term that represents a cost of assigning the label pair $X_i$ to the given pixel i. The object selection module 112 computes the unary term according to the following:

$$D(X_i) = -\log P_{C_i}(S_i)$$

Here, the probability $P_{C_i}(S_i)$ is based on a confidence map determined for the visual cue $C_i$ that indicates how likely it is that pixel i belongs to the selected portion of the image or to the unselected remainder according to that individual visual cue. In one or more implementations, confidence maps are computed using one or more known confidence map generation techniques, e.g., geodesic distance transform. Properties of geodesic distance transform include inherently encoding spatial information between pixels and include separating regions that have similar features but are not adjacent more accurately than other confidence map generation techniques. These properties are beneficial for user-aided object selection from images. With regard to using geodesic distance transform with depth cue maps, for instance, geodesic distance transform produces a distance measure between pixels and a user selection input since depth cue maps are capable of showing physical connectivity of depicted objects at adjacent pixels.

The object selection module 112 computes both a selected portion confidence map and an unselected remainder portion confidence map given the selection input data 404. The object selection module 112 determines a set of pixels $U_1$ that correspond to the selection input 204 (e.g., are underneath a touch made by a finger according to the selection input data 404) and another set of pixels $U_0$ that do not correspond to the selection input 204 (e.g., are not underneath a touch made by a finger according to the selection input data 404 or are underneath a touch made by a user to designate pixels not to be selected). Initially, the object selection module 112 constructs a weighted graph G=(V,E), where V is a set of nodes of the graph G, and E is the edges between the nodes V. The object selection module 112 computes a weight using a different distance measure for each of the visual cues. For the color visual cue, for instance, the object selection module 112 converts the RGB value of a pixel into LAB space (a color-opponent space with dimensions L for lightness and A and B for the color opponent dimensions, based on nonlinearly compressed coordinate), and uses L2 norm as the distance. For depth, the object selection module 112 may use an absolute distance between depth values. For surface normal, the object selection module 112 may use a cosine similarity to compute a similarity score between two unit normal vectors representative of the surface normal, and then convert the difference in similarity score as a distance measure.

When the object selection module 112 uses geodesic distance, the geodesic distance between any two pixels x and y of the image under consideration (e.g., image 202) is a length of a shortest path d(x,y) in the graph G. Given the graph G, the object selection module 112 is thus capable of computing the length of the shortest path d(x,y) using Dijkstra's algorithm. As part of determining the probability $P_{C_i}(S_i)$ based on the confidence map, the object selection module 112 computes, for each pixel i of the image, a geodesic distance to a closest pixel in the set of pixels $U_1$ that correspond to the selection input 204 according to the following:

$$d(i, U_1) = \min_{j \in U_1} d(i,j)$$

Here, the geodesic distance computed is represented as $d(i,U_1)$. The term j represents a given pixel in the set of pixels $U_1$ that correspond to the selection input 204. The object selection module 112 also computes for each pixel i of the image, a geodesic distance to a closest pixel in the set of pixels $U_0$ that do not correspond to the selection input 204 according to the following:

$$d(i, U_0) = \min_{j \in U_0} d(i,j)$$

Here, the geodesic distance computed by the object selection module 112 is represented as $d(i,U_0)$. In this equation, the term j represents a given pixel in the set of pixels $U_0$ that do not correspond to the selection input 204. The object selection module 112 then converts the two computed distance measures, $d(i,U_1)$ and $d(i,U_0)$, into a probability measure as follows:

$$P_{C_i}(S_i) = \frac{d(i, U_{\bar{S}_i})}{d(i, U_{S_i}) + d(i, U_{\bar{S}_i})}$$

Here, the term $\bar{S}_i$ represents an opposite label than is represented by the term $S_i$ (e.g., if $S_i$ represents that pixel i is part of the selected portion then $\bar{S}_i$ represents that pixel i is part of the unselected remainder). The object selection module 112 carries this out for each visual cue independently.

In addition, the object selection module 112 computes a pixel pairwise term $f(X_i, X_j)$ that corresponds to a cost of assigning two adjacent pixels, i and j, of the image the label pairs $X_i$ and $X_j$, respectively. In other words, for a given pixel i, the object selection module 112 computes the pixel pairwise term for each pixel adjacent to pixel i. In contrast to conventional techniques which compute pixel pairwise terms as a function of segmentation labels (e.g., in the form of $f(S_i,S_j)$) alone, the object selection module 112 computes the pixel pairwise term $f(X_i,X_j)$ in a manner that handles multiple visual cues as follows:

$$f(X_i, X_j) = \begin{cases} 0, & \text{if } C_i = C_j \text{ and } S_i = S_j \\ g'(i, j), & \text{otherwise} \end{cases}$$

Here, the term g'(i,j) represents a similarity between pixels i and j. If the visual cue labels and the segmentation labels are the same for neighboring pixels i and j, (e.g., $C_i=C_j$ and $S_i=S_j$) there is no cost to label the pixels in this way. However, if either the visual cue labels or the segmentation labels are different for the neighboring pixels, then the cost is computed as the similarity g'(i,j) between the pixels. The more similar the pixels i and j are according to the similarity g'(i,j), the less the cost of assigning the label pairs label pairs $X_i$ and $X_j$. The object selection module 112 computes the similarity between the pixels i and j as follows:

$$g'(i, j) = \min\left(\exp\left(\frac{-D_{C_i}(i,j)}{2\sigma_{C_i}^2}\right), \exp\left(\frac{-D_{C_j}(i,j)}{2\sigma_{C_j}^2}\right)\right)$$

The term $D_{C_i}$ represents a gradient at pixel i of a visual cue map generated for the image corresponding to the visual cue $C_i$. In the case that the visual cue label for pixel i is the same as the visual cue label for pixel j (e.g., $C_i=C_j$), no cost is assigned if the segment labels also do not change (e.g., when $S_i=S_j$). However, when different segment labels are given to the neighboring pixels (e.g., when $S_i \neq S_j$, which represents that one of pixel i or pixel j is labeled as part of the selected portion while the other pixel is labeled as part of the unselected remainder), the object selection module 112 assigns a cost inverse to an edge strength for the labeling. When the visual cue labels for pixel i and pixel j are not the same, the object selection module 112 chooses the visual cue that is most discriminative (e.g., in which there is the most confidence) in terms of being able to accurately identify whether the neighboring pixels i and j are part of the selected portion or part of the unselected remainder.

Once the object selection module 112 computes the unary term $D(X_i)$ and the pixel pairwise term $f(X_i,X_j)$, the object selection module 112 combines them using the multi-label MRF energy function set out above. In particular, the object selection module 112 chooses the label pairs that minimize the energy of the function E(X). To minimize the energy of the function E(X), the object selection module 112 employs alpha-beta swap, which is an algorithm that causes the object selection module 112 to randomly select two labels from the label set and then try to reduce the energy by swapping the labels.

In one or more implementations, rather than minimizing the energy for individual pixels of an image, e.g., by computing the unary term and the pixel pairwise term with respect to individual pixels of the image under consideration (e.g., image 202), the object selection module 112 computes pixel regions (e.g., super pixels) and minimizes the energy function for the pixel regions. In such implementations, the object selection module 112 computes the unary term and the pixel pairwise term with respect to the pixel regions computed for the image. To compute the pixel regions, the object selection module 112 may use the simple linear iterative clustering (SLIC) technique. The resulting pixel regions include multiple contiguous similar pixels, e.g., that are similar in color, similar in depth, or the like. When the object selection module 112 uses the SLIC technique to compute the pixel regions, the object selection module 112 generates feature vectors for each of the visual cues on a pixel region that are a mean of visual cue values over the pixel region.

Regardless of whether the object selection module 112 uses individual pixels or pixel regions to minimize the energy function, when the object selection module 112 minimizes the energy function the pixelwise cue selection module 406 and the image segmentation module 410 track and save the visual cue labels and the segmentation labels assigned. The pixelwise cue selection module 406 can thus produce the chosen cue indications 408 from the visual cue labels assigned as part of minimizing the energy function. In a similar manner, the image segmentation module 410 can produce the selected portion data 412 from the segmentation labels assigned as part of minimizing the energy function. Further, the segmentation labels identify a given pixel as being part of the selected portion or part of the remainder. Thus, the selected portion data 412 is configured to identify each pixel of the image 202 as either being part of the selected portion 208 of the image 202 or as part of the unselected remainder of the image 202.

The selected portion data 412 enables image editing operations to be performed relative the selected portion 208, such as background replacement, color and tone manipulation, copying and pasting, and so forth. In addition to selecting the selected portion 208, the chosen cue indications 408 and the selected portion data 412, enable the object selection module 112 to generate a map that indicates which visual cues served as a basis for identifying pixels as part of the selected portion or part of the unselected remainder.

Figure 5:
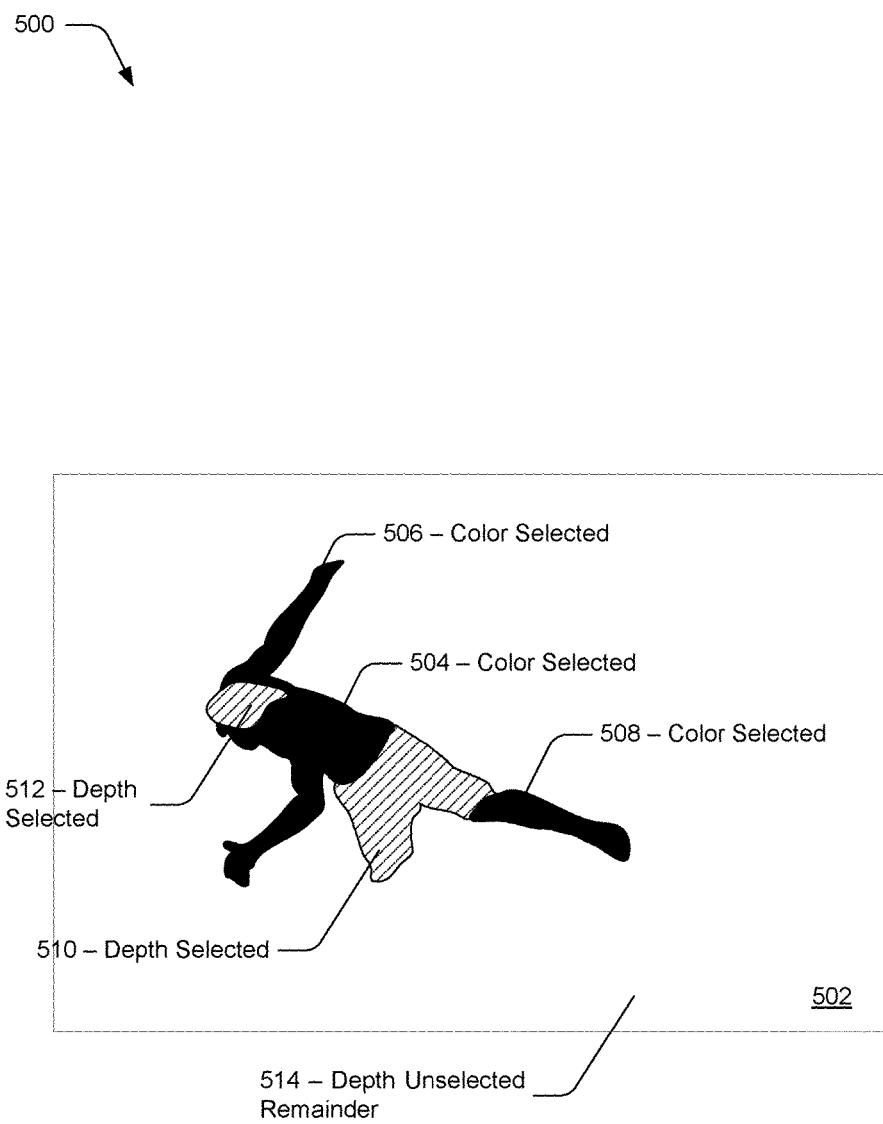
FIG. 5 depicts an example of a map that indicates which of multiple visual cues served as a basis for identifying pixels of an image as selected or not selected.

FIG. 5 depicts an example 500 of a map that indicates which of multiple visual cues served as a basis for identifying pixels of an image as selected or not selected. In particular, the illustrated example 500 includes cue indication map 502, which indicates which of multiple visual cues were used to identify pixels of an image as selected or as not selected. The cue indication map 502 corresponds to image 202 of FIG. 2. The cue indication map 502 may result from application of the techniques described above to select selected portion 208 based on the user selection input 204. Further, the cue indication map 502 may be generated, in part, using the information conveyed by the visual cue maps 302, 304, such as when the visual cue maps 302, 304 correspond to color cue information and depth cue information, respectively.

The cue indication map 502 includes color selected portions 504, 506, 508, which indicate that the color cue was used to identify the corresponding pixels of the image 202 as part of the selected portion 208. Depth selected portions 510, 512 indicate the pixels of the image 202 that are identified as part of the selected portion using the depth cue. Finally, depth unselected remainder portion 514 indicates the pixels of the image 202 that are identified as part of the unselected remainder portion using the depth cue.

It should be appreciated that when visual cues are used in addition to color and depth to identify portions of an image as selected or not, a cue indication map generated for a selection can also indicate those additional cues. A cue indication map can indicate which cues were used to identify pixels as selected or not in a variety of different ways without departing from the spirit or scope of the techniques described herein. By way of example and not limitation, the portions may be labeled with text (e.g., "color cue/selected", "color cue/not selected", "depth cue/selected", "depth cue/not selected", and so on), the portions may be displayed with colors that represent each visual cue and selection indication (e.g., a first color may be used to indicate that color cue served as a basis to identify the pixel and that the pixel is selected, a second color may be used to indicate that the color cue served as the basis to identify the pixel but that the pixel is not selected, and so on), the portions may be formatted or labeled in other ways to indicate the visual cue used to select or used not to select the portions.

Having discussed example details of the techniques for user input-based object selection using multiple visual cues, consider now some example procedures to illustrate additional aspects of the techniques.

Example Procedures

This section describes example procedures for user input-based object selection using multiple visual cues in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the example computing device 102 of FIG. 1 that makes use of a cue extraction module 110 and object selection module 112 or one implemented as the example system 400 of FIG. 4 that also makes use of those modules.

Figure 6:
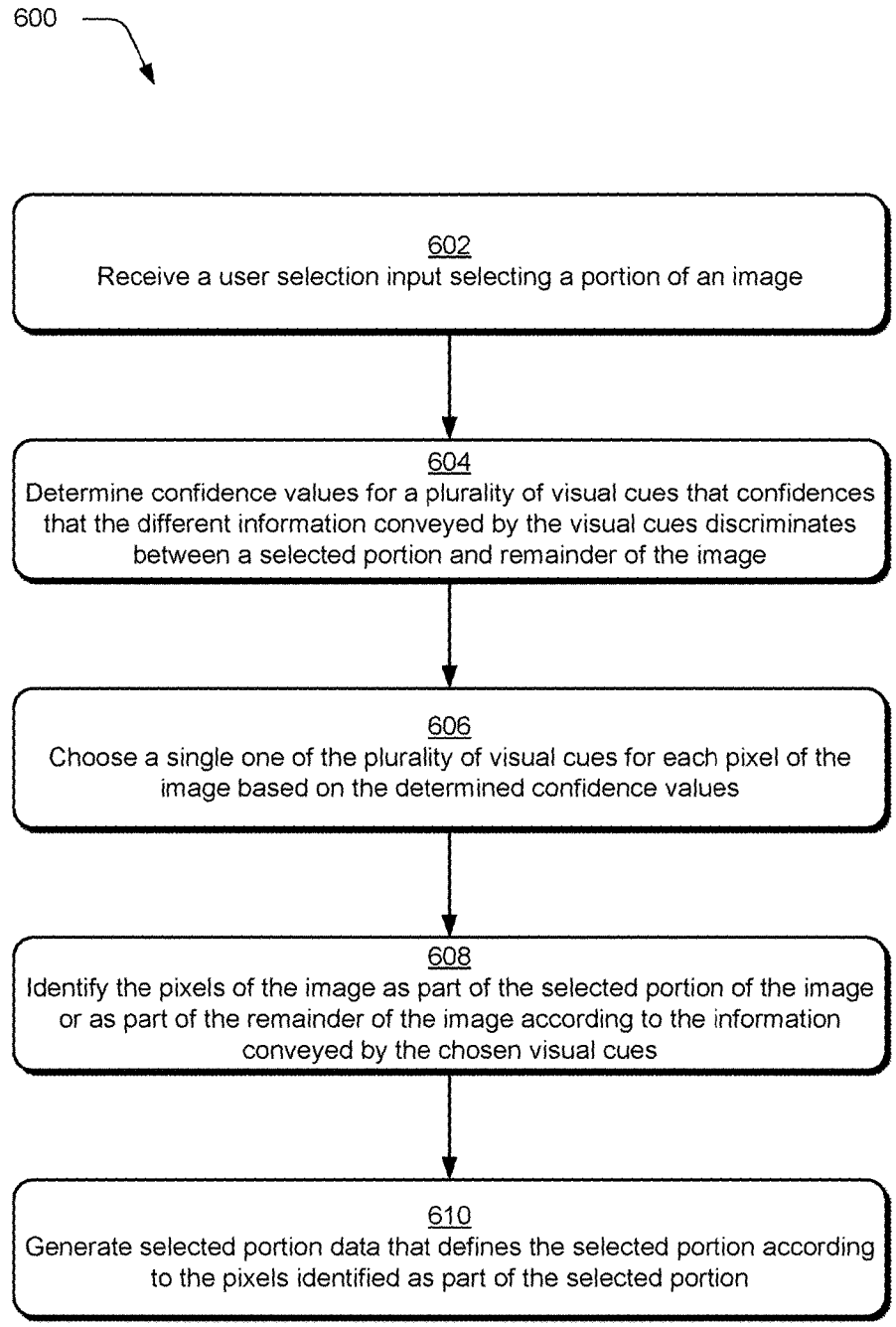
FIG. 6 is a flow diagram depicting a procedure in an example implementation in which a selected portion of an image is defined, in part, by choosing for each pixel of the image which of a plurality of visual cues is used to identify the pixel as part of the selected portion of the image or part of an unselected remainder portion.

FIG. 6 depicts an example procedure 600 in which a selected portion of an image is defined, in part, by choosing for each pixel of the image which of a plurality of visual cues will be used to identify the pixel as part of the selected portion of the image or as part of an unselected remainder. A user selection input is received for selecting a portion of an image (block 602). For example, the selection input 204 is received at computing device 102 for selecting a portion of the image 202.

Confidence values are determined for each of a plurality of visual cues and indicate levels of confidence that the different information discriminates between a selected portion of the image and a remainder of the image (block 604). The different visual cues convey different information about content depicted in the image, and the confidence values are determined based, in part, on the user selection input. For example, the cue extraction module 110 extracts information about the content depicted in the image 202 for a plurality of visual cues, such as color information, depth information, surface normal information, motion information, texture information, 3D mesh structure information, 3D point cloud information, and so on. In one or more implementations, the cue extraction module 110 generates visual cue maps for each of the visual cues to maintain this information on a per pixel basis, e.g., for a color cue map there is color information for each pixel that describes a color of the object depicted in the image at that pixel.

The object selection module 112 determines a confidence of the information conveyed by the visual cues over the pixels of the image. In particular, the object selection module 112 determines a confidence that the information conveyed by the visual cue is capable of discriminating between whether a pixel is to be included as part of the selected portion of the image or as part of the unselected remainder of the image based on the selection input 204. For example, when an analysis of the color information provided for a pixel indicates that the color information is unclear as to whether that pixel is part of the selected portion or part of the remainder, then there is less confidence in the color information than when the analysis indicates that the color information is clear as to whether that pixel is part of the selected portion or part of the remainder. Confidence is associated with the depth information, and the information provided by other cues in a similar manner.

A choice from the plurality of visual cues is made for each pixel of the image based on the respective confidence (block 606). The object selection module 112 chooses, for each pixel of the image 202, a single one of the plurality of visual cues, such that there is a pixel to chosen visual cue correspondence. The object selection module 112 chooses the single visual cue for a pixel based on the confidence determined for that visual cue at the pixel, e.g., the confidence of the chosen visual cue as being able to discriminate whether the pixel is part of the selected portion or the unselected remainder. Additionally, the object selection module 112 chooses the single visual cue for each pixel of the image 202 by optimizing an energy function as described in more detail above. In so doing, the object selection module 112 chooses the visual cues to maximize the confidence of the information used for identification over an entirety of the image 202.

The pixels of the image are identified as part of the selected portion of the image or as part of the remainder of the image that is not selected according to the information conveyed by the chosen visual cues (block 608). By way of example, the image segmentation module 410 analyzes the chosen cue indications 408 to identify the pixels of the image 202 as selected or as not selected. To identify a given pixel as selected or as not selected, the image segmentation module 410 compares the selection input 204 to the information conveyed by the chosen visual cue (e.g., according to the chosen cue indications 408).

If the information about the selection input 204 matches the information conveyed about the pixel by the chosen visual cue, then the image segmentation module 410 identifies the pixel as being selected, e.g., if the pixels of the selection input are of a first color, the color cue is chosen for the pixel, and the color information about the pixel indicates that the pixel has a color within a threshold similarity of the first color, then the pixel is identified as part of the selected portion. However, if the information about the selection input 204 does not match the information conveyed about the pixel by the chosen visual cue, then the image segmentation module 410 identifies the pixel as being part of the unselected remainder of the image, e.g., if the pixels of the selection input are again of the first color, the color cue is chosen for the pixel, but the color information about the pixel indicates that the pixel has a color that is not within a threshold similarity of the first color, then the pixel is identified as part of the unselected remainder portion.

Selected portion data is generated that defines the selected portion according to the pixels identified as part of the selected portion (block 610). For example, the image segmentation module 410 generates the selected portion data 412 according to the identification performed at block 608. The selected portion data 412 is indicative of the selected portion 208. For example, the selected portion data 412 can be configured as a value for each pixel of an image that indicates whether the pixel is identified as selected or not, e.g., '1' if the pixel is selected and '0' if the pixel is not selected. The selected portion data 412 may define a binary selection mask, for instance, that is applicable to the image by an image editing application to enable image editing operations to be performed. Alternately or in addition, the selected portion data 412 may correspond to an image file that is different from but derived from the image. The different image file may correspond merely to the selected portion, such that the dimensions of the different image file correspond to bounds of the selected portion 208.

Since the selected portion data 412 indicates which pixels of the image 202 are identified as being selected and which pixels of the image 202 are not selected, the selected portion data 412 enables image editing operations to be performed relative to the selected portion 208 without applying the image editing operations to the remainder of the image 202. For example, the selected portion data 412 enables the selected portion of a color image to be changed to black and white, but the remainder of the image to be left in color. As another example, the selected portion data 412 enables the image editing application to increase a contrast level of the selected portion without adjusting the contrast level of the unselected remainder. The selected portion data 412 also enables image editing operations to be performed on the remainder of the image 202 without applying the image editing operations to the selected portion 208. For example, the selected portion data 412 enables the selected portion of an image to be kept in color, and the other portions of the image (e.g., background) to be changed to black in white. As another example, the selected portion data 412 enables a blur level of the selected portion of an image to be left alone while the blur level of the unselected portion (e.g., background) is increased so that the unselected portion is made to look blurry. These are just a few examples of image editing operations that may be performed using the selected portion data 412. It should be appreciated that a variety of other image editing operations may be performed relative to a selected portion of an image and an unselected remainder portion of the image without departing from the spirit or scope of the techniques described herein.

Further still, a selected portion can be refined when a user provides additional user selection inputs. By way of example, after the method 600 of FIG. 6 is performed once, an additional user selection input can be received to refine the selected portion of the image. Based on the original user selection input received (e.g., at block 602) and the additional user selection input, the techniques described herein can again determine confidences for each of the visual cues, choose a single visual cue for each pixel of the image based on the determined confidences, and identify the pixels of the image as part of the selected portion of the image or as part of the unselected remainder of the image. The image segmentation module 410 identify the pixels by labeling them with segmentation labels which indicate that a pixel is part of the selected portion or part of the remainder.

Regarding the additional user selection inputs, the original user selection input received (e.g., at block 602) can specifically indicate a portion of the image that is to be selected (e.g., the original user selection input can be made over pixels that are to be part of a selected object), and an additional user selection input can specify a portion of the image that is not to be selected (e.g., the additional user selection input can be made over pixels that are not to be included as part of the selected object). The additional user selection input may also be used to further specify a portion of the image that is to be selected, e.g., the additional user selection input can be made over pixels that were not selected in first attempt to select the object but made to further indicate portions of the image that are to be included as part of the selected object. It is to be appreciated that in some scenarios a "user selection input" (e.g., both the original user selection input and additional user selection inputs) may correspond to two separate inputs, a first input to indicate a portion of the image that is to be selected and a portion of the input that is not to be selected. Thus, user selection input can comprise a variety of different inputs for selecting an object from an image or for refining a selection without departing from the spirit or scope of the techniques described herein.

Furthermore, the process of receiving additional user selection inputs to refine the selected portion and identifying the pixels of the image as part of the selected portion or as part of the remainder can be repeated a number of times (using, each additional time, the original user selection input and each additional selection input) to determine the selected portion of the image. In one or more implementations, user input can be received to delete a previously received selection input, e.g., when a user believes the previously-received selection input does not contribute to selecting the correct portion of the image. Still further, a user interface via which the user selection inputs are received can allow a user to indicate when he or she is satisfied with the selected portion, such as by selecting a button labeled "Yes" on a dialog that asks "Are you satisfied with the selection?".

Figure 7:
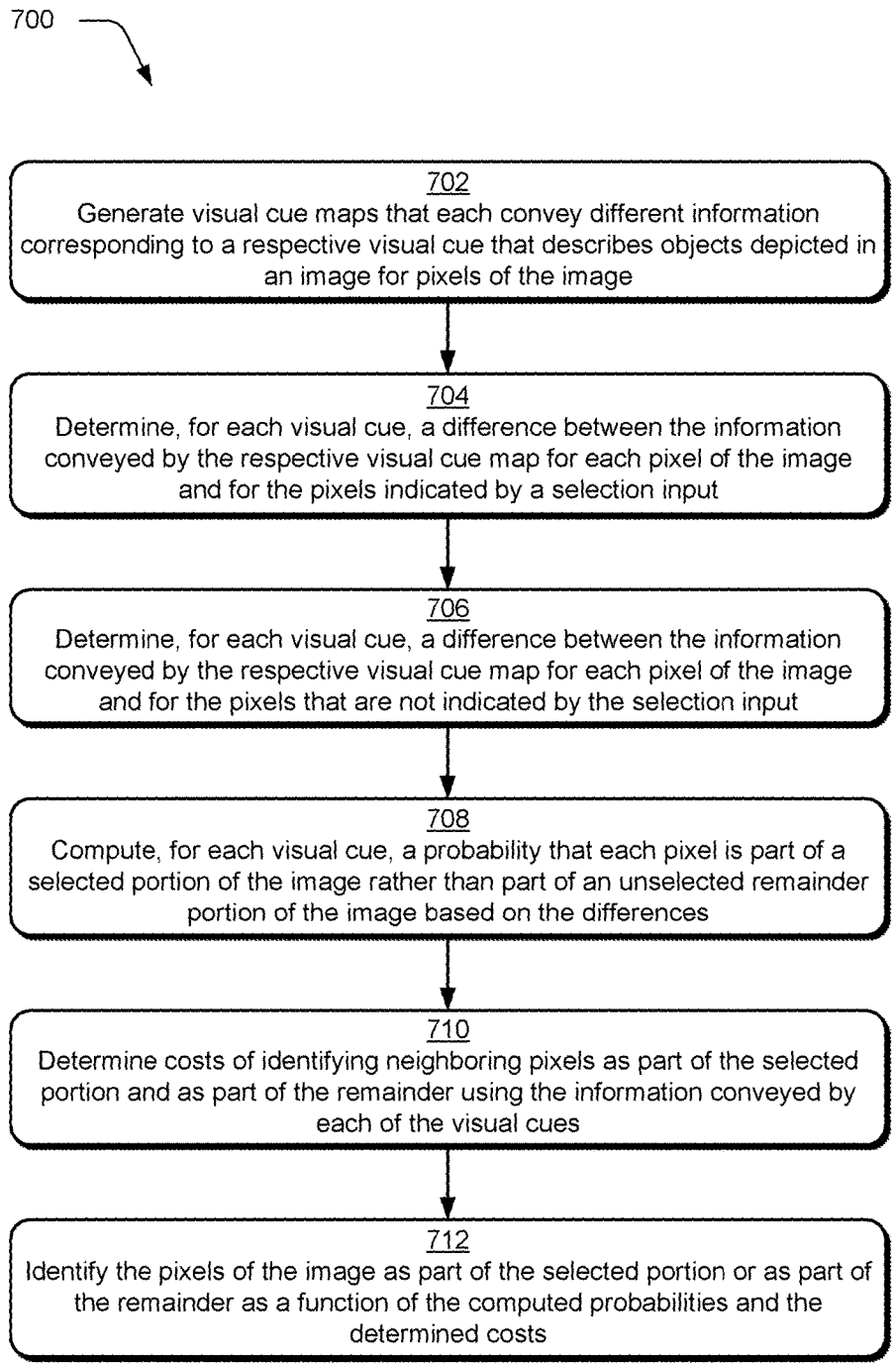
FIG. 7 is a flow diagram depicting a procedure in an example implementation in which pixels of an image are identified as part of the selected portion of the image or as part of the remainder as a function of probabilities that the pixels are part of the selected portion and costs associated with identifying neighboring pixels in different ways.

FIG. 7 depicts an example procedure 700 in which pixels of an image are identified as part of a selected portion of the image or as part of the remainder, and in which the identification is made as a function of probabilities that the pixels are part of the selected portion based on differences with the pixels of a selection input, and as a function of costs associated with identifying neighboring pixels as part of the selected portion and as part of the remainder using the information conveyed by each of the visual cues.

Multiple visual maps are generated for an image that each convey different information corresponding to a respective visual cue about objects depicted in the image (block 702). A given visual cue map conveys the information of the respective visual cue for each pixel of the image. By way of example, the cue extraction module 110 generates the visual cue maps 402 for the image 202, such as the visual cue maps 302, 304. The visual cue maps 302, 304 each convey different information about the objects depicted in the image 202. The visual cue map 302, for instance, conveys information corresponding to a first visual cue (e.g., color information) about the objects depicted in the image 202. The visual cue map 304 conveys information corresponding to a second visual cue (e.g., depth information) about the objects depicted in the image. Further, the visual cue maps 402 convey the respective information for each pixel of the image 202. In this way, information corresponding to the first visual cue is conveyed by the visual cue map 302 for each pixel of the image 202. Likewise, information corresponding to the second visual cue is conveyed by the visual cue map 304 for each pixel of the image 202.

For each visual cue, a difference is determined in the information conveyed by the respective visual cue map between each pixel of the image and the pixels indicated by a selection input (block 704). By way of example, the selection input 204 corresponds to some pixels of the image 202, e.g., the pixels over which the input was made. Given the selection input 204, the object selection module 112 determines a difference between each pixel of the image 202 and the pixels corresponding to the selection input 204. In particular, the object selection module 112 determines the difference in the information conveyed by each of the visual cues.

With reference to the visual cue map 302, the object selection module 112 determines a difference in the information corresponding to the first visual cue (e.g., conveyed by the visual cue map 302) between each pixel of the image 202 and the pixels indicated by the selection input 204. The object selection module 112 also determines a difference in the information corresponding to the second visual cue (e.g., conveyed by the visual cue map 304) between each pixel of the image 202 and the pixels indicated by the selection input 204. The object selection module 112 determines these differences between each pixel of the image 202 and the pixels indicated by the selection input 204, for each of the visual cue maps 402, e.g., when a color cue map, depth map, and surface normal map are generated, the differences in color information, depth information and surface normal information are determined between each pixel of the image and the pixels indicated by the selection input.

For each visual cue, a difference is determined in the information conveyed by the respective visual cue map between each pixel of the image and the pixels that are not indicated by a selection input (block 706). By way of example, the selection input 204 corresponds to some pixels of the image 202, e.g., the pixels over which a touch input was made. The pixels that are not indicated by the selection input, however, are the pixels of the image other than those over which the input was made. In one or more implementations, a user may provide an input to indicate a portion of the image that is not to be included as part of the selected portion, e.g., a user may provide one or more tap inputs, scribble inputs, and so on to indicate which portions of the image are not to be included as part of the selected portion. In other words, a user may provide input to indicate which portions of the image correspond to the unselected remainder of the image.

With information indicative of the pixels that do not correspond to the selection input or pixels that a user marks as part of the unselected remainder of the image, the object selection module 112 determines a difference between each pixel of the image 202 and the pixels that do not correspond to the selection input 204. In particular, the object selection module 112 determines the difference in the information conveyed by each of the visual cues.

With reference to the visual cue map 302, the object selection module 112 determines a difference in the information corresponding to the first visual cue (e.g., conveyed by the visual cue map 302) between each pixel of the image 202 and the pixels that are not indicated by the selection input 204. The object selection module 112 also determines a difference in the information corresponding to the second visual cue (e.g., conveyed by the visual cue map 304) between each pixel of the image 202 and the pixels that are not indicated by the selection input 204. The object selection module 112 determines these differences between each pixel of the image 202 and the pixels that are not indicated by the selection input 204, for each of the visual cue maps 402, e.g., when a color cue map, depth map, and surface normal map are generated, the differences in color information, depth information and surface normal information are determined between each pixel of the image and the pixels that are not indicated by the selection input.

For each visual cue, a probability is computed that each pixel is part of a selected portion of the image rather than part of an unselected remainder portion of the image based on the differences (block 708). For example, the object selection module 112 computes probabilities for each pixel of the image 202 that the pixel is part of the selected portion 208 based on the differences computed at block 704 and block 706. In particular, for a given pixel the object selection module 112 computes a probability that the pixel is part of the selected portion based on the differences for each visual cue.

A determination is made of costs to identify neighboring pixels of the image as part of the selected portion and as part of the unselected remainder using the information conveyed by each of the visual cues (block 710). By way of example, the object selection module 112 computes the costs, in the manner described in more detail above, of identifying the pixels of the image 202 as part of the selected portion and as part of the unselected remainder using the information conveyed by each of the visual cues, e.g., each visual cue for which a visual cue map is generated at block 702.

The pixels of the image are identified as part of the selected portion or as part of the unselected remainder as a function of the computed probabilities and the determined costs (block 712). For example, the object selection module 112 identifies the pixels of the image 202 as part of the selected portion 208 or as part of the remainder as a function of the probabilities computed at block 708 and a function of the costs determined at block 710. In one or more implementations, the object selection module 112 optimizes the multi-label MRF energy function described above based, in part, on the probabilities computed at block 708 and the cost determined block 710. The object selection module 112 uses the segmentation labels that result from minimizing that energy function to identify the pixels of the image 202 as part of the selected portion 208 or as part of the unselected remainder. Based on the identification, the image segmentation module 410 generates the selected portion data 412, which is used to implement the selection of the selected portion 208.

Having described example procedures in accordance with one or more implementations, consider now an example system and device that can be utilized to implement the various techniques described herein.

Example System and Device

Figure 8:
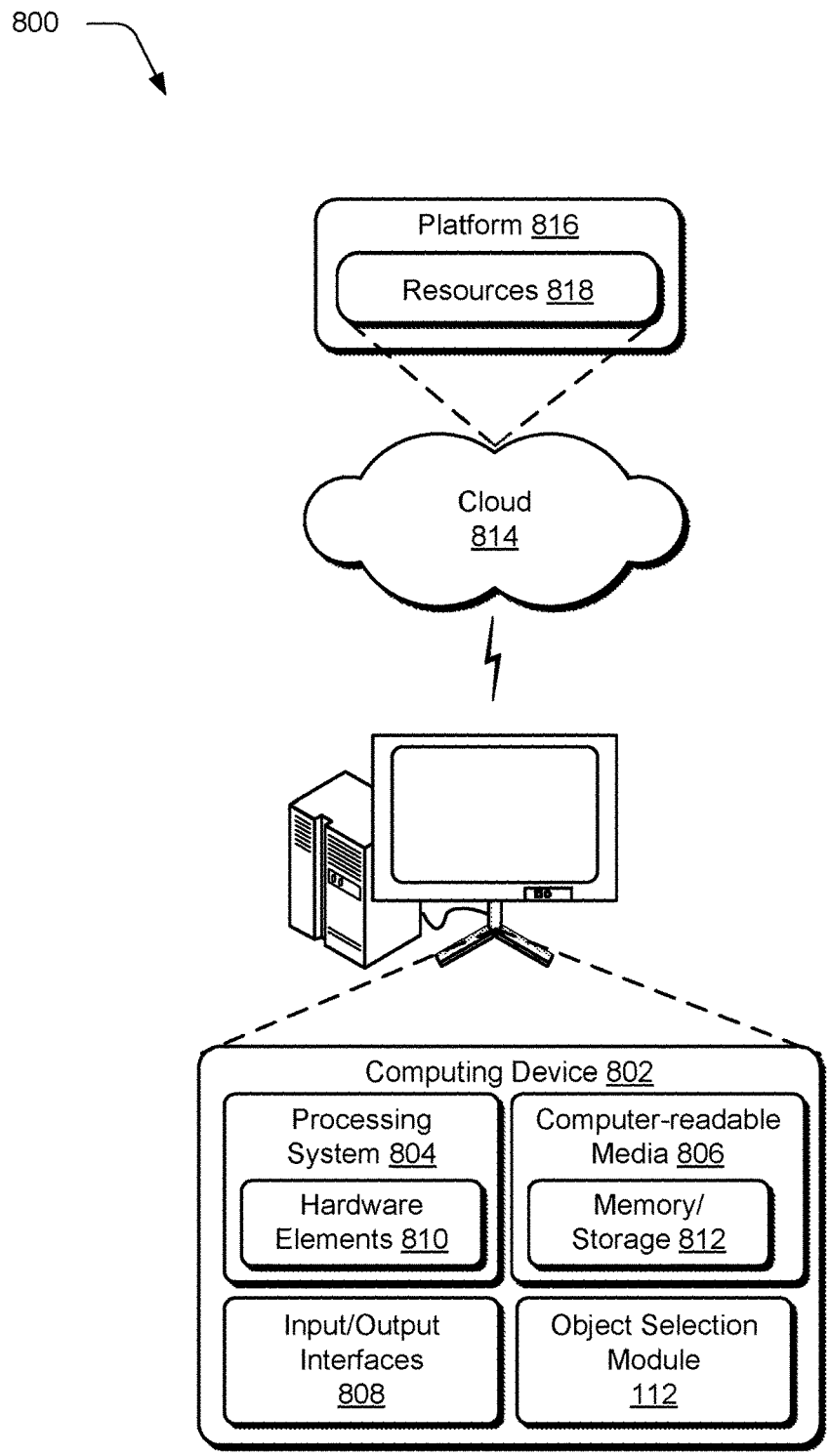
FIG. 8 illustrates an example system including various components of an example device that can be employed for one or more implementations of techniques for user input-based object selection using multiple visual cues described herein.

FIG. 8 illustrates an example system generally at 800 that includes an example computing device 802 that is representative of one or more computing systems and/or devices that implement the various techniques described herein. This is illustrated through inclusion of the object selection module 112, which operates as described above. The computing device 802 may be, for example, a server of a service provider, a device associated with a client (e.g., a client device), an on-chip system, and/or any other suitable computing device or computing system.

The example computing device 802 includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 802, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules are implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software are achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device implementation, implementation of functionality described herein is distributed throughout the system 800. For example, the functionality is implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to define a portion of an image as selected based on user selection input, a method implemented by a computing device, the method comprising:

receiving a user selection input for selecting the portion of the image;

determining confidence values for a plurality of visual cues, each of the visual cues conveying different information about content depicted in the image, the confidence values determined for pixels of the image based, in part, on the user selection input, and the confidence values indicating, for each of the pixels, levels of confidence that the different information discriminates between a selected portion of the image and a remainder of the image;

selecting a single visual cue from the plurality of visual cues for each of the pixels of the image based on the confidence values and without combining information conveyed by multiple different visual cues, the single visual cue selected having a confidence value indicating a greater level of confidence than at least one other visual cue;

based on information conveyed by selected visual cues, identifying whether the pixels of the image correspond to the selected portion or the remainder of the image;

generating selected portion data that defines the selected portion according to the pixels identified as the selected portion; and displaying an indication of the selected portion in accordance with the selected portion data.

2. A method as described in claim 1, wherein the plurality of visual cues includes a color cue that conveys color information indicative of a color of the content depicted in the image, the color cue conveying the color information for each of the pixels of the image.

3. A method as described in claim 1, wherein the plurality of visual cues includes a depth cue that conveys depth information indicative of a depth of the content depicted in the image, the depth of the content determined relative to an image capture device associated with the image.

4. A method as described in claim 1, wherein the plurality of visual cues includes a surface normal cue that conveys surface-normal information indicative of a normal to surfaces of the content depicted in the image.

5. A method as described in claim 4, wherein the surface-normal information is derived from depth information ascertained by an image capture device associated with the image.

6. A method as described in claim 1, wherein the information conveyed by the single visual cue selected for at least one pixel of the image identifies the at least one pixel as corresponding to the selected portion and the information conveyed by a second visual cue identifies the at least one pixel as corresponding to the remainder.

7. A method as described in claim 1, wherein the information conveyed by the single visual cue selected for at least one pixel of the image identifies the at least one pixel as corresponding to the remainder and the information conveyed by a second visual cue identifies the at least one pixel as corresponding to the selected portion.

8. A method as described in claim 1, further comprising generating a map that indicates the selected visual cues for the pixels of the image.

9. A method as described in claim 1, further comprising performing the determining, the selecting, and the identifying without combining the different information conveyed by the plurality of visual cues for a given pixel.

10. A method as described in claim 1, wherein the selected portion data enables a graphical effect to be applied via an image editing application to the selected portion of the image without application of the graphical effect to the remainder of the image.

11. A system implemented in a digital medium environment to define a portion of an image as selected based on user selection input, the system comprising:
  at least one processor; and
  memory having stored thereon computer-readable instructions that are executable by the at least one processor to perform operations comprising:
    receiving a user selection input for selecting the portion of the image;
    labeling pixels of the image by optimizing a function in which each individual pixel is assigned a label pair based, in part, on the user selection input,
    the label pair including both:
    a segmentation label configured to identify whether the individual pixel corresponds to a selected portion of the image or a remainder of the image that is not selected, and
    a visual cue label configured to identify one of a plurality of visual cues selected for the individual pixel, the plurality of visual cues conveying different information about content depicted in the image, and
  wherein the function is optimized, in part, by determining a cost of assigning label pairs to the individual pixel and the pixels adjacent to the individual pixel, the cost based on the visual cues indicated in the label pairs for the individual pixel and an adjacent pixel and on values indicating a confidence that the different information conveyed by the visual cues discriminates between the selected portion and the remainder;
  generating selected portion data that defines the selected portion according to the labeling; and
  displaying an indication of the selected portion in accordance with the selected portion data.

12. A system as described in claim 11, wherein the operations further comprise:
  receiving an additional user selection input for refining the selected portion of the image; and
  labeling the pixels of the image by performing an additional optimization of the function based on the user selection input and the additional user selection input.

13. A system as described in claim 11, wherein the operations further comprise generating a map that indicates selected visual cues for the pixels of the image.

14. A system as described in claim 11, wherein the operations further comprise:
  computing pixel regions of the image that include multiple contiguous similar pixels; and
  labeling the pixel regions by optimizing the function, the optimizing including assigning each of the pixel regions the label pair based on the user selection input.

15. A system as described in claim 14, wherein the pixel regions are computed using a simple linear iterative clustering (SLIC) technique.

16. A system as described in claim 11, wherein the function optimized is a Markov Random Field (MRF) energy function.

17. A system as described in claim 11, wherein optimizing the function further includes computing pairwise terms for the individual pixel, a pairwise term being computed for each of the pixels adjacent to the individual pixel, and the pairwise term indicating the cost of assigning label pairs to the individual pixel and the adjacent pixel.

18. A system as described in claim 11, wherein the plurality of visual cues includes at least two of:
  a color cue;
  a depth cue;
  a surface normal cue;
  a motion information cue;
  a texture information cue;
  a three dimensional (3D) mesh structure information cue; or
  a 3D point cloud information cue.

19. In a digital medium environment to define a portion of an image as selected based on user selection input, a method implemented by a computing device, the method comprising:
  receiving a user selection input for selecting an object depicted in the image;
  generating a plurality of visual cue maps for the image, each of the visual cue maps conveying different information about content depicted in the image according to a respective visual cue;
  automatically selecting the object from the image based on the user selection input and the plurality of visual cue maps, the object selected by:
    determining a single visual cue map from the plurality of visual cue maps for each pixel of the image; and
    identifying whether the pixel corresponds to the selected object or not using the different information conveyed by the determined visual cue map and without using the different information conveyed by at least one of the other visual cue maps;
  generating selected portion data indicative of the selected object from the image; and
  displaying an indication of the selected object in accordance with the selected portion data.

20. A method as described in claim 19, wherein the plurality of visual cue maps correspond to a plurality of visual cues, including at least one of:
  a color cue that conveys color information indicative of a color of the content depicted in the image, the color cue conveying the color information for each of the pixels of the image;
  a depth cue that conveys depth information indicative of a depth of the content depicted in the image, the depth of the content determined relative to an image capture device associated with the image; and
  a surface normal cue that conveys surface-normal information indicative of a normal to surfaces of the content depicted in the image.

* * * * *